Aug. 27, 1957  E. M. SETZEKORN ET AL  2,803,952
REFRIGERATED STORAGE TANK

Filed Feb. 4, 1955  6 Sheets-Sheet 1

INVENTOR.
EUGENE M. SETZEKORN
WILLIAM G. ESPERSEN
BY JOHN AMMERMAN

ATTORNEYS

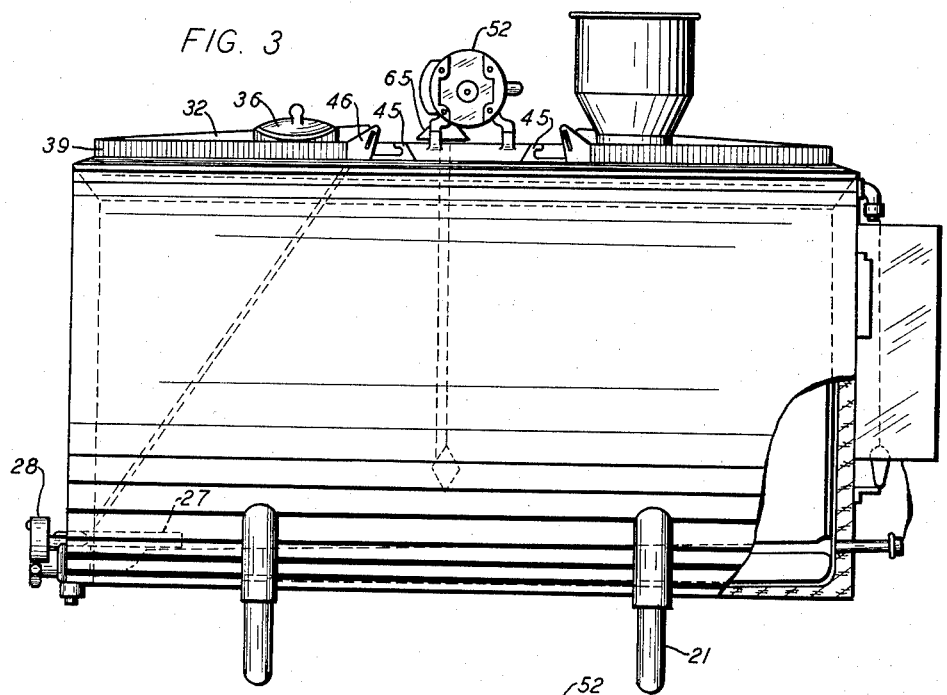
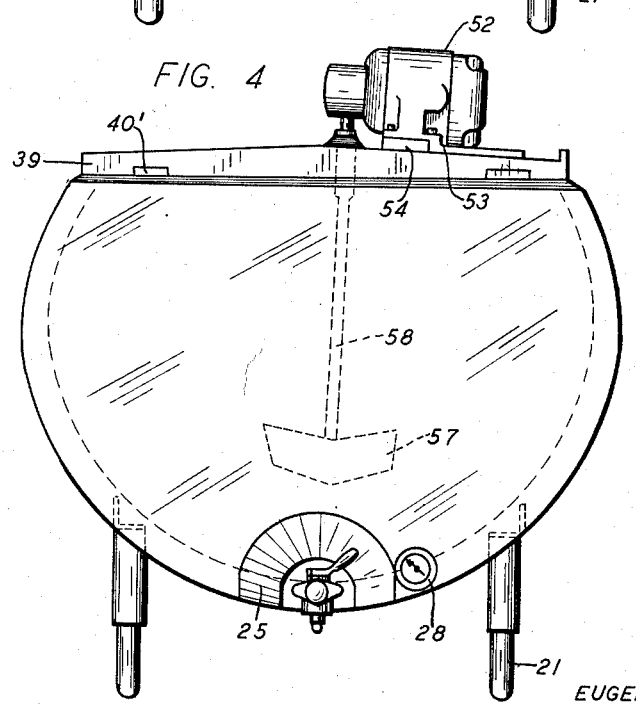

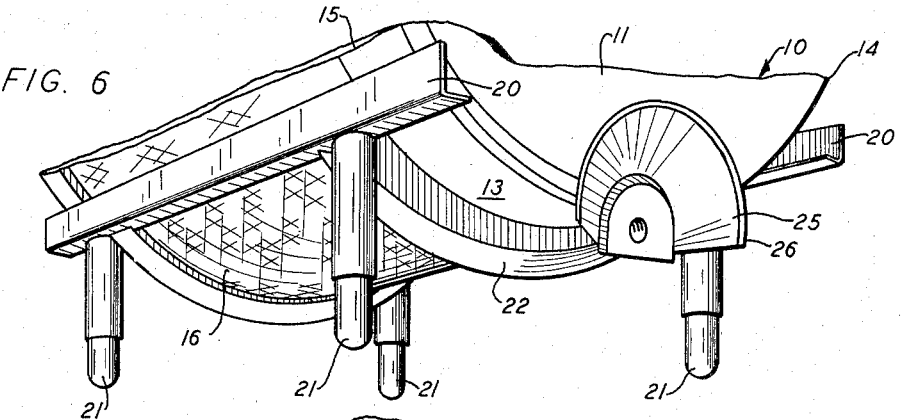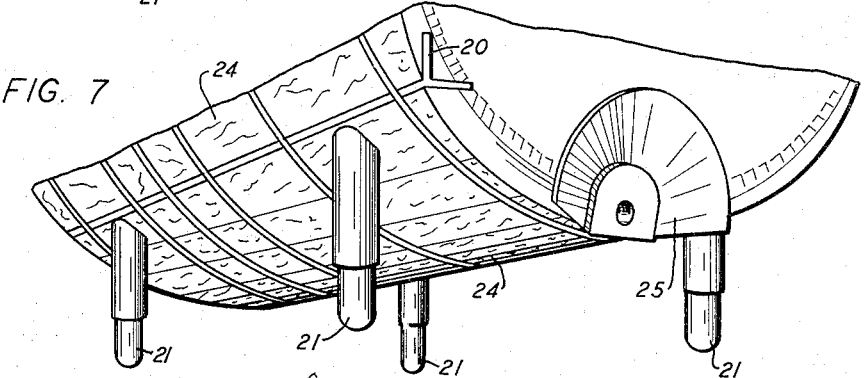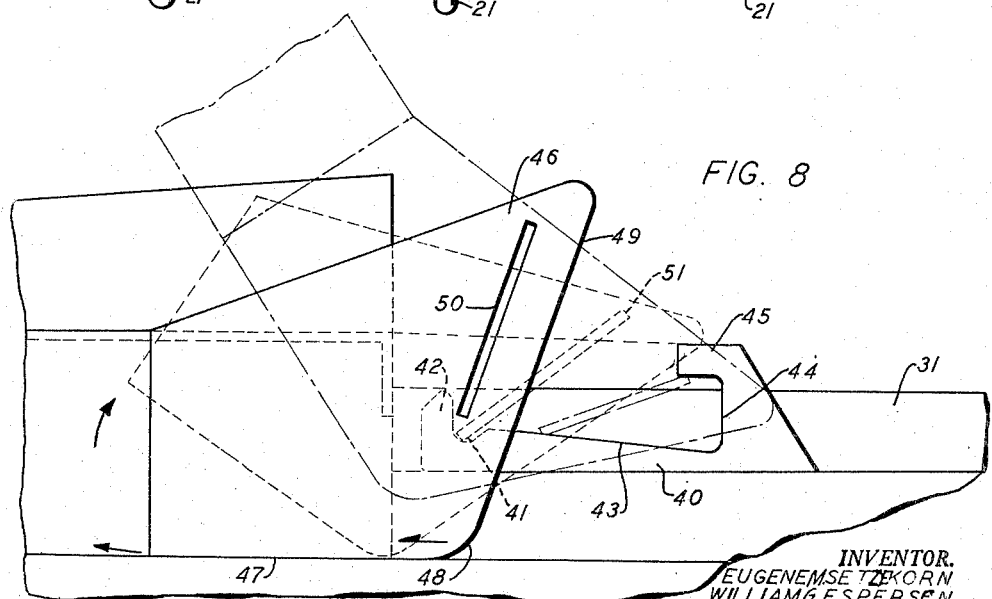

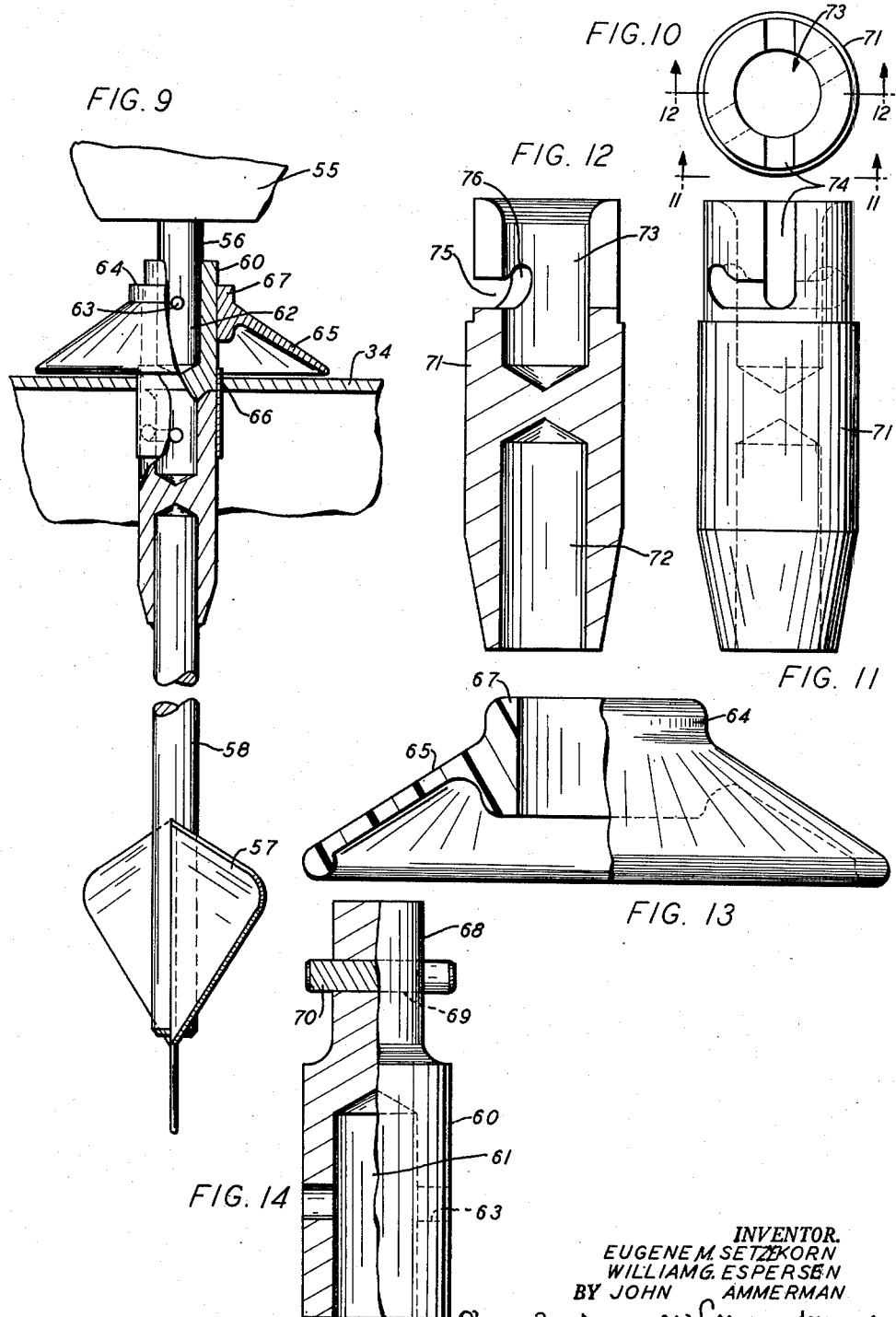

Aug. 27, 1957  E. M. SETZEKORN ET AL  2,803,952
REFRIGERATED STORAGE TANK
Filed Feb. 4, 1955  6 Sheets-Sheet 6

INVENTOR.
EUGENE M. SETZEKORN
WILLIAM G. ESPERSEN
BY JOHN    AMMERMAN

ATTORNEYS

United States Patent Office 2,803,952
Patented Aug. 27, 1957

2,803,952

REFRIGERATED STORAGE TANK

Eugene M. Setzekorn, Elmhurst, William G. Espersen, Chicago, and John Ammerman, Western Springs, Ill., assignors to U. S. Industries, Inc., Chicago, Ill., a corporation of Delaware Application February 4, 1955, Serial No. 486,108

5 Claims. (Cl. 62—141)

This invention relates to a tank and more particularly to a tank for use in the collection and storage of a perishable liquid, such as milk, under refrigerated conditions to prevent deterioration of the content material until removed for use.

It is an object of this invention to produce a tank of the type described for use in the collection and storage of milk and the like under refrigerated conditions; which is shaped to prevent distortion under conditions of use so as to provide for constant volume at any given liquid level; which embodies means within the refrigeration cycle responsive to the temperature of the liquid within the tank for controlling the amount of heat extracted from the content material and the temperature of the refrigerating elements so as to maintain the content material at the desired temperature level without freezing; which, during the cooling period, constantly agitates the content material within the tank for uniform temperature distribution; which embodies improvements in construction and operation including means for raising the cover plates to open position and for holding the cover plates in open position without fear of displacement or inadvertent closing thereby to free both hands of the operator for use in pouring milk and the like fluids into the tank and for cleaning out the tank to maintain sanitary conditions; which includes means at the outlet for preventing accumulation of substantial amounts of fluid in areas blocked from refrigeration and where the material can become heated because of the ambient temperature up to a temperature where deterioration and souring can take place; which embodies agitation means of sanitary construction suspended into the tank for maintaining the fluid in constant movement, and which embodies numerous other improvements that enhance the flexibility, appearance, sturdiness and life of the tank in use.

These and other objects and advantages of this invention will hereinafter appear and for purposes of illustration, but not of limitation, an embodiment of the invention is shown in the accompanying drawings in which—

Figure 3 is a side elevational view of the tank shown in Figure 1;

Figure 4 is a front end elevational view of the tank shown in Figures 1 and 3;

Figure 6 is a fragmentary perspective view from the bottom side showing the lower part of the farm tank of Figure 1 in an early stage of its construction;

Figure 7 is a perspective view similar to that of Figure 6 showing the construction of the lower part of the farm tank in a later stage of its construction;

Figure 8 is a detailed elevational view illustrating the arrangement of parts in the latching means for the cover plates on the tank of Figure 1;

Figure 9 is a sectional elevational view of the agitator assembly mounted in the tank and embodying features of this invention;

Figure 10 is a top plan view of an adapter in the agitator assembly of Figure 9;

Figure 11 is an elevational view taken substantially along the line 11—11 of Figure 10;

Figure 12 is a sectional elevational view taken along the line 12—12 of Figure 10;

Figure 13 is an elevational view partially in section of the agitator shield shown in Figure 9;

Figure 14 is an elevational view partially in section of another element of the drive shaft adapter used in Figure 9.

Figure 1:
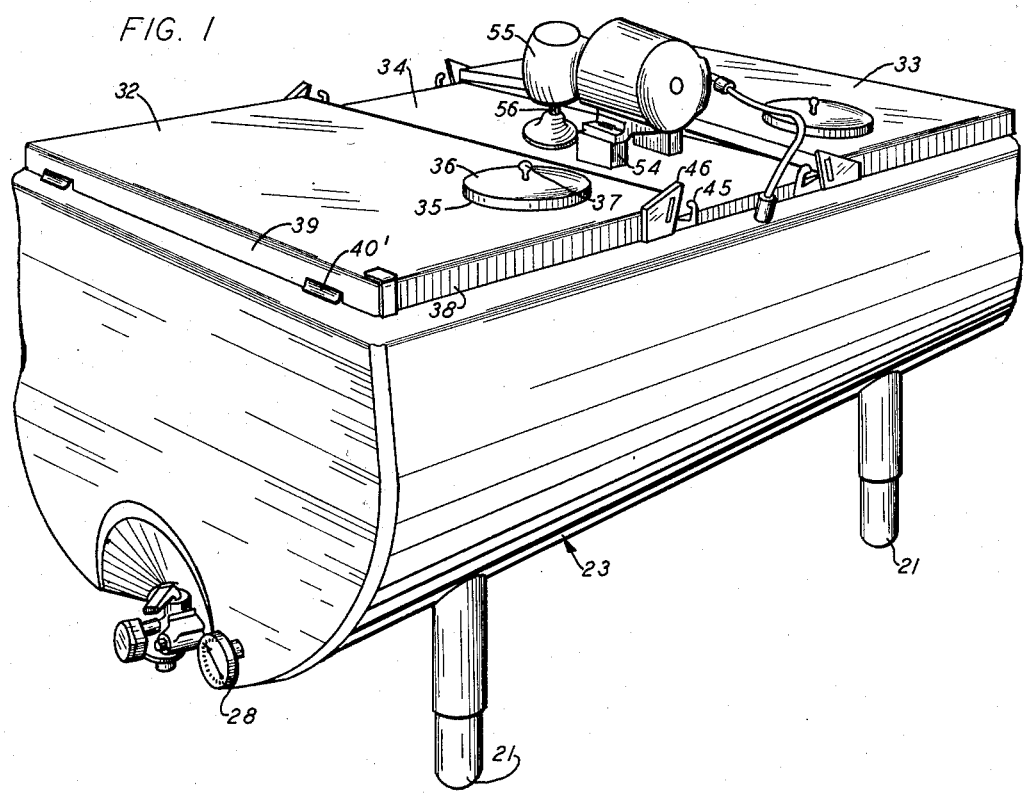
Figure 1 is a perspective elevational view of a refrigerated tank embodying features of this invention.
Figure 2:
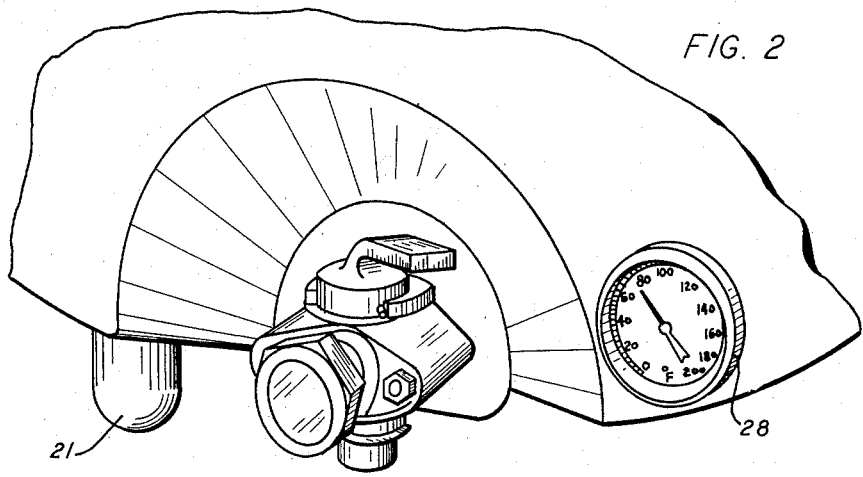
Figure 2 is a perspective view of a portion of the tank showing the end wall containing the outlet for the content material.

Description will hereinafter be made of a tank embodying features of this invention adapted chiefly to be used on a farm or the like for the collection and storage of milk until removed by proper means for transportation to central depots for processing. It will be understood that a tank of the type described may be adapted for use in the transportation or storage of other perishable liquids and that the inventive concepts are not limited to the specific features described but that various changes may be made in the details of construction and operation without departing from the spirit of the invention.

As illustrated in the drawings, a farm tank embodying features of this invention comprises an elongated inner housing 10 formed of stainless steel and the like having vertically disposed end walls 11 and 12 and a curvilinear bottom wall 13 which merges into upwardly extending side walls 14 and 15. The bottom and side walls are contoured to form a trough of U-shape with the side walls bowed outwardly uniformly forming a sector of a radius which is faired to the bottom wall. This construction has been found to obviate distortions or deflections of the walls of the tank, such as ordinarily take place in tanks of the type heretofore employed under load for similar purposes. As a result of the reduction in distortion of the tank walls under load, a tank embodying features of this invention prevents variation in capacity of the tank. This enables accurate determination, at all times, of the amount of content material within the tank. This is to be distinguished from the conventional more straight-sided tanks which become distorted under load with resultant variation in volume.

Fixed to the underside of the inner casing 10 is an evaporator plate system 16 containing a plurality of communicating passages through which a liquid refrigerant, such as Freon, is circulated from an inlet or plurality of inlets 17 adjacent the bottom to an outlet or plurality of outlets 18 adjacent the top which communicates through suitable conduits with the refrigeration system for liquefaction, which will hereinafter be described. The evaporator plates 16, preferably formed of metal, are preferably dimensioned to have a length slightly less than the length of the inner casing and a width greater than the bottom wall 13 of the tank. The evaporator plates therefore extend part way up each of the side walls 14 and 15 to cover at least the bottom half of the tank. Such refrigeration means has been found to provide for far better refrigeration and better control than ice water systems of the type heretofore employed and the improvements, which will hereinafter be pointed out, for control of expansion avoid the reduction of temperature to undesirable levels such as might cause freezing of the milk or other liquid content material, often experienced with conventional direct expansion systems. Such controlled expansion in a refrigeration system of the type described provides for storage under optimum temperature conditions without loss due to freezing at lower temperature or rapid deterioration at high temperatures and with the utilization of considerably less space and weight than heretofore required in equipment making use of the ice water systems. A further advantage is to be found in the savings in weight and cost of equipment and increase in the capacity per unit cost.

Another novel concept in the improved construction of a tank of the type described resides in the utilization of a free support for the tank on a rigid frame which engages the underside of the inner casing or shell throughout the length thereof. For this purpose use is made of laterally spaced angle irons 20 supported on legs 21 and rigidly joined in laterally spaced apart relation by longitudinally spaced apart cross brace members 22 having a curvilinear contour. In the assembled relation, the cradle receives the underside of the tank in seating relation upon engagement of the underside of the tank throughout the length on the angle irons 20 and throughout the width on the curvilinear cross brace members 22. This is to be distinguished from conventional constructions using supporting legs welded directly to the tank for support thereof whereby distortions have been found to occur under load at the points of support with resultant deterioration of the tank. The line supports between angle irons 20 across laterally spaced apart portions of the tank in the region where the bottom wall merges into the side walls provides for substantially complete elimination of possible distortion under load because of the load distribution and support throughout an extended area. Thus there is provided a more desirable assembly from the standpoint of appearance, as well as construction and operation.

The tank assembly is formed with an outer casing 23 shaped to correspond to the inner casing 10 and dimensioned to be slightly greater in all directions to provide a spaced relation between walls of the inner casing and the outer casing with openings in the bottom wall of the outer casing through which the legs 21 of the supporting frame extend. The space between the walls of the inner and outer casing is filled with insulation 24, such as cork slabs, fiber glass batts, or the like.

In one end wall portion, the inner casing is formed with an outlet opening at the bottom through which the fluid content material may be drained from the tank. In order to avoid the accumulation of an amount of content material in areas incapable of refrigeration for maintenance under safe storage conditions, the outer tank is cut away in an arcuate portion about the opening and an alcove ring 25 of funnel shape is joined, as by welding, to the outer casing along its flared out edge portions 26 while the inner end of smaller dimension is secured, as by welding, to the inner casing about the outlet opening. This enables access to the outlet opening for the location of valves and the like for the control of fluid flow from within the tank as closely as possible to the outlet opening to minimize or substantially eliminate the presence of any dead space normally present in passages communicating the valve members with the tank in which refrigerated material may be circulated. Thus little, if any, fluid content material becomes lodged in pipes or other passages outside the insulated refrigerated space communicating the interior of the tank with the flow control valves as distinguished from the substantial amounts which remain in uninsulated areas in constructions of the type heretofore employed. By the use of the funnel shaped alcove ring for establishing a sealing relation between the outer casing and the inner casing about the outlet opening, it is possible to insulate practically all of the elements joined as a part of the outlet whereby so little dead space is available as to enable refrigeration conditions to be maintained of substantially all of the liquid content material.

In addition to the outlet opening, a thermometer well 27 is provided in the lower portion of the inner tank for receiving the stem of a thermometer 28 which extends lengthwise through the end wall of the outer tank and the insulation therebetween for indicating the temperature of the fluid content material adjacent the outlet opening.

The inner casing is open at the top and the space between the upper edge of the inner casing and the upper edge of the outer casing is joined all around by a metal top plate 30 in the form of a ledge which provides a sealing relation therebetween and joins the inner and outer casings into a unitary structure. An outer edge portion 31 of the inner casing extends upwardly about the opening for receiving one or more cover plates 32 in sealing relation, such for example as the pair of cover plates 32 and 33, illustrated in the modification shown in the drawings.

Rigid with the joined casings, at their upper edges, is a center bridge 34 in the form of a metal plate which extends cross wise between the upper edges through an intermediate portion of the opening for dividing the opening into two sections and for providing support for agitating means, which will hereinafter be described, for circulating the content material within the tank. The center bridge also provides support for the means for enabling the cover plates to be retained in open position of adjustment for full access to the interior of the casing and for cooperating with the cover plate in its closed position of adjustment for maintaining sanitary conditions.

Each cover plate is formed with an inlet opening 35 fitted with a strainer through which the liquid is poured from smaller containers into the tank. A closure 36 is adapted to be received in the opening for concealing same and a handle or knob 37 is provided on the closure for easier manipulation. Each cover plate, which is dimensioned to be slightly larger than the separated openings to the inner casing, has an integral flange 38 extending downwardly all around from the edge portions thereof to receive the flange portions 31 of the inner tank and the central bridging member 34 in fitting relation when the cover plates are in their lowered or closed positions. The cover plates are provided with means for handling, such, for example, as the portions struck outwardly, at at 40', in the lower edge portion of flange 39.

A further feature of this invention resides in the means for protecting the operator against injury in use and which enables the operator to make use of both hands either for emptying the fluid content material from smaller connecting units into the storage tank or for use in gaining access into the interior of the tank for purposes of cleaning the interior thereof, as required when used for the collection of milk and the like.

In the past, satisfactory means have not been supplied for holding the cover plate in raised position or else such means were so unreliable as to make it necessary for the operator to seek self-protection by using one hand to hold up the cover plate to make certain that the heavy plate did not fall on his hands, leaving only one hand for use in effecting the desired cleaning and the like operations. Where more effective latching means have been employed, their construction and operation have increased the cost of the unit and complicated its construction and operation and for that reason have been found to be objectionable.

Thus it is a further object of this invention to embody means in a structure of the type described embodying latching means which are simple in construction and easy in operation firmly to engage the cover plate for holding same in raised position without fear of displacement and which effects such latching means automatically in response to the elevation of the cover plate to raised position, which has little, if any, objectionable effect on the cost of the unit, the appearance of the unit or the ease in operation of the unit, and which frees both hands of the operator for use thereby to enable one person to carry out the operations heretofore requiring two or more or otherwise carried out dangerously by one person with difficulty.

As illustrated in Figure 8 of the drawings, the latching means embodying features of this invention comprises a hinge block 40 rigid with the lateral flanges 31 and extending upwardly therefrom along side the forward and rearward end portion of the central bridging member 34. The hinge block 40 is formed with a curvilinear groove 41 in the upper edge spaced inwardly a short distance from the outer end portion with a raised end portion 42 therebetween. The edge 43 beyond the groove is inclined downwardly to an upright end wall 44 having a portion 45 which extends back from the upper edge portion to provide a hook at the end into which the inclined surface 43 leads.

For cooperation with the hinge block 40, a hinge plate 46 is rigidly secured to the cover plate in alignment with the lateral flanges 38 and in a manner to extend inwardly beyond the inner edges thereof substantially in overlapping relation with the hinge block. Each hinge plate is formed with a lower edge 47 aligned with the bottom edge of the flanges 38 and with a corner portion 48 of curvilinear contour leading into the outer edge 49 of the hinge plate which extends upwardly at an obtuse angle with the bottom edge 47, the angle being calculated to align the outer edge with the top wall 30 of the tank when the cover plate is rocked to raised position. Integral with the hinge plate and extending perpendicularly laterally from the inner face thereof is a flange plate 50 preferably parallel with the outer edge 49 of the hinge plate and having its lower edge spaced a short distance upwardly from but in alignment with the groove 41 when the cover plate is in its normal or closed position of adjustment. The flange plate 50 is adapted to have a length which is less than the distance between the base of the groove 41 and the end of the extension 45 so as to enable the outer end of the flange plate 50 to clear the extension 45 when the lower end of the flange plate 50 is resting within the groove during rocking movement of the cover plate from lowered to original position of adjustment. A similar assembly is provided adjacent each of the inner edges of the cover plate for balanced support thereof in raised position.

In operation, when the cover plate is raised from closed position, indicated by solid lines in Figure 8, to raised or open position, indicated by broken lines in Figure 8, for gaining access to the interior of the casing for cleaning or for repair, the operator grips the outer flange 39 at the hand groove 40' for rocking the cover plate upwardly about its pivot. During the initial portion of such movement, the cover plate rocks about the curvilinear corner 48 of the hinge plate which rests on the top wall of the casing until the flange plate 50 engages the upper end of the slide 43 immediately beyond the groove 41 as indicated by the broken line 51 in the drawings. Thereafter, the cover plate pivots about the point of contact between the flange plate 50 and the upper surface of the slide 43 thereby to lift the hinge plate off of the top wall of the tank until the cover plate is raised into a position to bring the flange plate substantially parallel with the top wall. At this point, the flange plate 50 and the entire cover plate is supported on the inclined slide 43 with the result that the unit is able automatically to slide downwardly until the outer end of the flange plate engages the upright wall 44. Thereafter, when the cover plate is released and permitted to rock downwardly about the lower edge of the flange plate as the pivot, the outer edge of the flange plate is unable to clear the hook 45 with the result that the cover is trapped in its raised position of adjustment, as indicated by the broken lines to the left in Figure 8. To close the opening, it is necessary to lift the cover plate for displacement of the flange plate 50 rearwardly into the groove 41. Thereafter the cover plate can be lowered normally about the lower end of the flange plate as the pivot until the curvilinear corner portion 48 of the hinge plate takes over as the pivot to raise the flange plate 50 out of the groove 41.

A still further improvement embodying features of this invention is to be found in the agitator assembly by which movement of the content material within the tank is maintained to insure uniform temperature distribution for refrigeration without working the material to the point where physical change occurs and whereby such agitation is effected by external driving means without contamination of the content material and with sufficient flexibility in construction to enable the parts to be assembled and disassembled easily and quickly for purposes of cleaning, as is required periodically in structures of the type described.

As illustrated in Figures 9–14 of the drawings, a driving motor 52 is secured by bolts 53 onto a pedestal 54 rigid with the top side of the central bridging member 34. A gear housing 55, interconnected with the shaft of the driving motor, converts the high speed rotational movement of the shaft to turning movement of a vertical gear shaft 56 at low speed for driving the agitator blade 57 supported within the tank adjacent the bottom end portion thereof on an elongate agitator shaft 58.

The agitator shaft 58 and the gear shaft 56 are interconnected by an adapter comprising an upper adapter member 60 in the form of a cylindrical rod having a bore 61 in the upper end portion dimensioned to receive the end portion 62 of the gear shaft 56 in fitting relation with aligned openings 63 in registry with an opening in the shaft 56 for insertion of a pin therethrough for transmitting turning movement of the shaft 56 to the adapter rod 60. An opening in the bridging member 34 is dimensioned to enable the adapter rod 60 to extend downwardly therethrough and the opening is protected from infiltration of dirt or other contaminating materials therethrough into the interior of the tank by an umbrella 65 in the form of a cone shaped member formed of hard rubber, metal or the like dimensioned to extend outwardly beyond the opening 66 and having a central hub 67 dimensioned to engage the adapter rod 60 in fitting relation for turning movement therewith over the opening.

The lower end portion 68 of the adapter rod 60 is dimensioned to be of smaller diameter than the remainder and is formed with an opening 69 extending diametrically through the lower end portion thereof for receiving a pin 70 dimensioned to have a length corresponding to the diameter of the rod so that the end portions of the pin will extend a corresponding distance beyond the end portion 68 of smaller diameter in which it is located.

Operatively engaged by the upper adapter member is a lower adapter member 71 in the form of a rod having a diameter corresponding to the diameter of the upper member 60 with a bore 72 in the lower end portion for receiving the upper end of the agitator shaft 58 in fitting relation. The upper end portion of the lower adapter member is also formed with a bore 73 dimensioned to receive the lower end portion 68 of the upper adapter member 60 and diametrically opposed vertical slots 74 are provided through the side walls of the adapter through the major length of the bore 73 with the slots 74 having a width corresponding to the diameter of the pin 70 so as to enable the pin to slide downwardly therethrough as the lower end portion 68 of the upper adapter member 60 is inserted into the bore 73 of the lower member 71. The vertically disposed slots terminate into horizontally disposed slots 75 having an upwardly turned portion 76 at the end with the horizontally disposed slots 75 extending in the direction of movement of the gear shaft from the vertically disposed slots 74 so that the pin 70 may be displaced downwardly through the vertically disposed slots 74 upon insertion of one adapter into the other following which the pin may be displaced laterally into the horizontally disposed slots 75 for latching the adapter parts together in the assembled relation to transmit rotational movement of the gear shaft 56 to the agitator 57 on the end of the agitator shaft 58.

For disassembly in separating the elements of the agitator, it is only necessary to turn either the agitator shaft or the gear shaft opposite that for normal turning movement while holding the other so that the pin 70 will be displaced laterally from the slot 75 into the vertical slot 74 whereby the upper and lower adapter members may be separated endwise for disengagement.

To the present, description has been made to improvements in the structural features of the refrigerated tank embodying features of this invention which enables more efficient utilization of space, better control of volume and capacity of the tank, better insulation, and means for eliminating dead spots or the like which might otherwise lead to deterioration of the content material such as souring of the milk. Description has also been made of the improvements in the door construction and latching members employed therewith for enabling full access to the interior of the tank without fear of harm or injury and without limiting the operator's use of his hands for the various operations to be carried out and in which means free of contamination are provided for agitation of the material within the tank, including means for assembly and disassembly thereof in a simple and efficient manner for cleaning. Each and every one of these improvements individually are believed to represent an important advance in the structure of containers of the type described and collectively, it is believed that they provide a new and improved container embodying means for enabling sanitary conditions to be maintained in a simple and efficient manner without noticeable increase in cost and with further reduction in the spoilage which can take place.

One of the more important concepts of this invention resides in means responsive automatically to the temperature of the content material for controlling the amount of liquid refrigerant introduced for evaporation and responsive automatically to control the temperature in the evaporators to avoid undesirable increases in temperature as well as such decreases in temperature as would cause excessive refrigeration or freezing.

Ice water systems and expansion systems have been used in the past for refrigeration purposes in tanks of the type described but such ice water systems require excessive space and larger equipment per unit volume of material to be refrigerated with little flexibility in temperature control. The expansion systems heretofore employed have lacked proper controls with respect to the amount of refrigeration and the extent of temperature reduction with the result that such systems have often provided excessive cooling with resultant freezing of the content material.

It is an object of this invention to provide a refrigeration system of the expansion type which embodies a high degree of flexibility in the selection of a temperature range for operation and which maintains the desired temperature conditions automatically for best operating conditions without excessive cooling and without undesirable rise in temperature and with a minimum utilization of space. Another object is to produce a refrigerated container of the type described wherein the refrigeration means and controls may be confined within a relatively little space capable of being directly mounted on the unit thereby to provide a complete unit in a composite assembly which occupies less space than heretofore required for the more complex and inflexible systems.

It is an object of this invention to provide a refrigeration system of the type described for satisfactory cooling of milk or other perishable liquids in bulk containers including means for providing an adequate supply of liquid refrigerant and means to reconvert the supply to a liquid state following its transformation to a gaseous phase during expansion for heat absorption, means for providing ample temperature difference between the liquid refrigerant and the content material without reduction in temperature beyond that which would cause freezing of the content material, which provides ample area for heat transfer to accomplish the desired reduction in temperature of the content material in minimum time and which provides satisfactory thermal contact between the liquid refrigerant and the container for conduction of heat removed from the liquid content material to the refrigerant.

Figure 5:
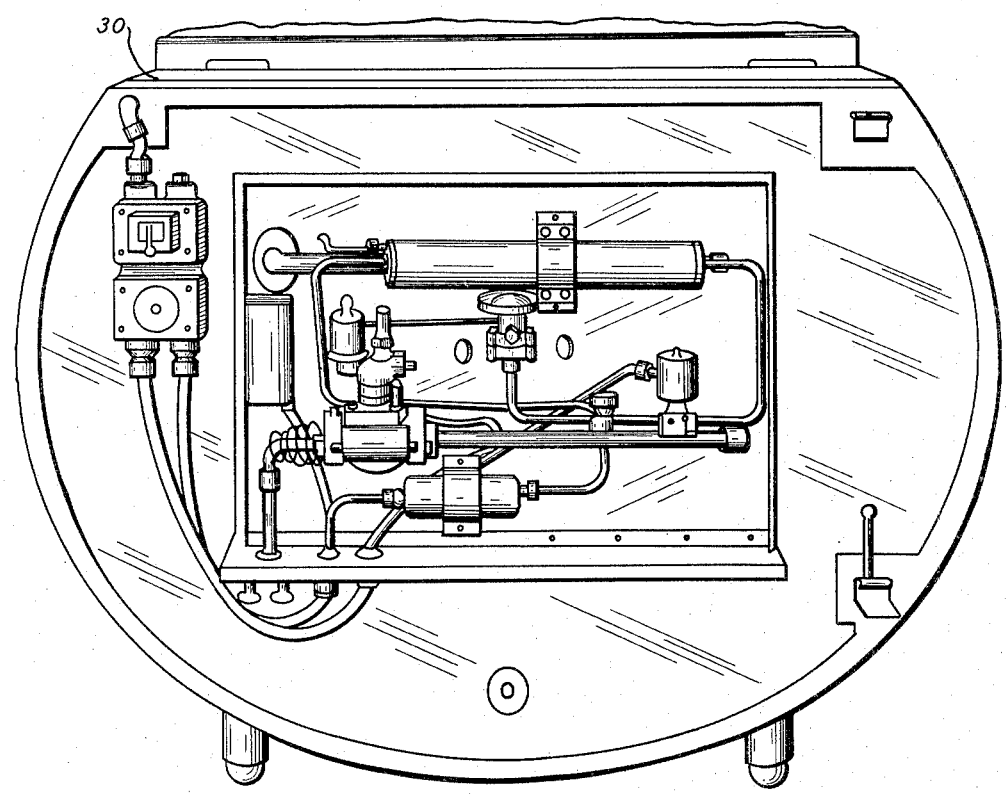
Figure 5 is an elevational view at the rear end of the tank shown in Figure 3 with the cover plate of the housing in which the refrigerant elements are located removed for illustration of the location of parts therein.
Figure 15:
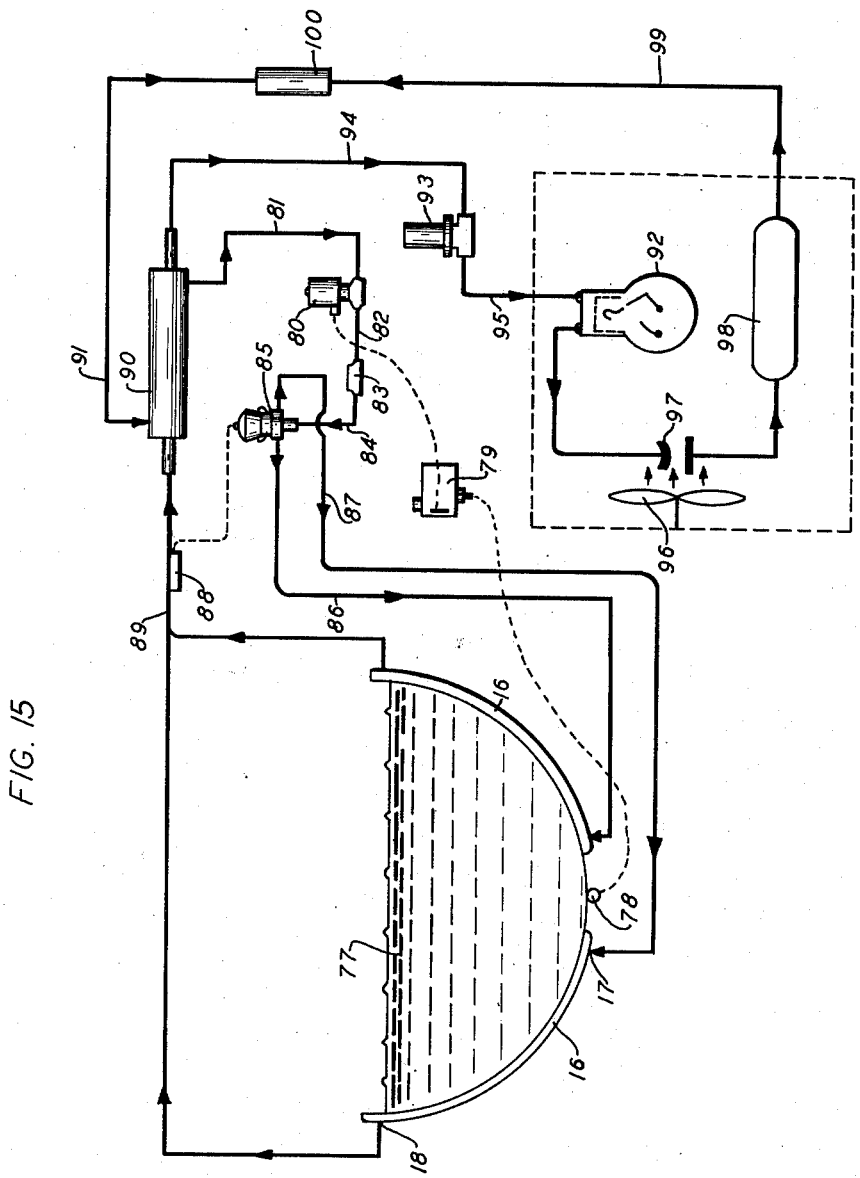
Figure 15 is a schematic diagram illustrating the refrigeration system for the tank illustrated in Figures 1–5.

Referring now to Figures 5 and 15 of the drawings, for a description of the refrigeration cycle and elements, 16 represents the evaporator plates fixed to the outer wall of the inner casing and which has inlet openings 17 at the bottom through which liquid refrigerant, such as Freon, is introduced and outlet openings at the top through which the gaseous material generated upon evaporation is returned to the liquefaction system. When the temperature of the milk or other liquid content material 77 within the tank rises beyond a predetermined level in response to heat transfer from the outside or in response to the introduction of a fresh increment of warm milk, a temperature sensitive bulb or thermostat 78 located preferably at the bottom of the inner casing in thermal contact with the fluid contact material 77, causes a switch 79 to open an electrically controlled solenoid valve 80 to permit flow of liquid refrigerant from conduit 81 into conduit 82 through a sight glass 83 to conduit 84 in communication with a thermal expansion valve 85. The amount of liquid refrigerant capable of flowing through the expansion valve 85 into conduits 86 and 87 in communication with the evaporator inlets 17 is controlled by a second temperature sensitive bulb or thermostat 88 located in the return line 89 closely adjacent the outlets 18 so that the temperature of the return gas in the return line will regulate the flow of liquid refrigerant to the amount calculated most efficiently to operate the evaporators 16 for temperature control.

The return gas from the evaporators 16 is led first through a heat exchanger 90 in heat exchange relation with the liquid refrigerant, such as Freon, which enters the heat exchanger through conduit 91 and leaves through conduit 81 (1) for extracting the heat from the liquid refrigerant to reduce its temperature and the possibility of gas formation prior to entry of the liquid refrigerant into the evaporators 16 and for more efficient cooling, and (2) for heating up the cold gas being returned from the evaporators to minimize the possibility of any liquefaction of any portion thereof prior to entrance into the compressor 92 which might otherwise cause damage thereof.

In addition to the control in the amount of liquid refrigerant fed to the evaporators 16, the temperature reduction by evaporation of the liquid refrigerant in the evaporators is further controlled by the pressure which is maintained within the evaporator. This is achieved by a back pressure regulator 93 in the return line 94 preferably beyond the heat exchanger 90 for operation by the gases after being heated up. The back pressure regulator valve may be set to maintain a minimum pressure within the evaporators thereby to restrain the boiling of the liquid refrigerant to limit the minimum temperature which can be developed thereby to prevent reduction of the temperature to the freezing point of the contained fluid 77 or other predetermined temperature conditions.

From the back pressure regulator, the gaseous refrigerant advances through conduit 95 to the liquefaction unit which includes a compressor 92 wherein the pressure of the return gas is raised, a cooler which makes use of a circulating fan 96 for blowing a stream of air (arrows) through a condenser 97 through which the compressed gases are circulated for extraction for heat of compression whereby liquefaction takes place for collection within a receiver 98 wherein the condensed liquids are stored for subsequent use in the refrigeration cycle. From the receiver, the liquid refrigerant is caused to flow through the conduit 99 through a dryer and filter cartridge 100 and into conduit 91 for passage through the heat exchanger prior to the previously described controls which limit the amount of liquid refrigerant circulated to the evaporators.

It will be apparent from the foregoing that there is provided a new and improved refrigerated tank adapted for farm use in the collection of milk and the like which embodies improvements in construction and operation as well as improvements in the refrigeration system whereby more efficient use is made of the tank for the purposes for which it was intended.

It will be understood that changes may be made in the details of construction, arrangement and operation without departing from the spirit of the invention, especially as defined in the following claims.

What is claimed is:

1. In a refrigerated storage tank for use with perishable liquids comprising a pair of inner and outer shells having curvilinear bottom and side walls and open at the top and formed of rigid material spaced one from the other all around with heat insulating material in between, evaporator plates having an inlet at one end into which liquid refrigerant is introduced and an outlet in another end from which the evaporated gaseous refrigerant is returned to a liquefaction system, and cover plates shiftable between raised position for access through the open end at the top into the interior of the inner shell and closed position for sealing off the open end of the shell, means for controlling liquid refrigerant to the evaporator plates for purposes of refrigeration, and means for agitation of the liquid material within the inner shell for maintaining uniform temperature distribution, the improvement which comprises supporting the inner casing independently of the outer casing on a cradle comprising a pair of elongate metal members spaced apart laterally by an amount corresponding to the width of the bottom wall of the inner casing to engage the inner casing substantially throughout its length adjacent the area wherein the bottom wall blends with the side walls, a pair of longitudinally spaced apart cross brace members joining the pair of laterally spaced apart frame members and formed to a curvilinear contour corresponding to the bottom wall portion of the inner casing between the laterally spaced apart supporting member, and legs extending downwardly integrally from the corners at the intersection between the cross brace members and the laterally spaced apart supporting members for supporting the frame above the supporting surface.

2. In a refrigerated storage tank for use with perishable liquids comprising a pair of inner and outer shells having curvilinear bottom and side walls and open at the top and formed of rigid material spaced one from the other all around with heat insulating material in between, evaporator plates having an inlet at one end into which liquid refrigerant is introduced and an outlet in another end from which the evaporated gaseous refrigerant is returned to a liquefaction system, and cover plates shiftable between raised position for access through the open end at the top into the interior of the inner shell and closed position for sealing off the open end of the shell, means for controlling liquid refrigerant to the evaporator plates for purposes of refrigeration, and means for agitation of the liquid material within the inner shell for maintaining uniform temperature distribution, the improvement which comprises supporting the inner casing independently of the outer casing on a cradle comprising a pair of elongate metal members spaced apart laterally by an amount corresponding to the width of the bottom wall of the inner casing to engage the inner casing substantially throughout its length adjacent the area wherein the bottom wall blends with the side walls, a pair of laterally spaced apart frame members and formed to a curvilinear contour corresponding to the bottom wall portion of the inner casing between the laterally spaced apart supporting member, and legs extending downwardly integrally from the corners at the intersection between the cross brace members and the laterally spaced apart supporting members for supporting the frame above the supporting surface, said inner and outer casings being in the form of a trough of U-shape in which the side wall portions are formed with a curvature having a larger radius than the curvilinear bottom wall portion with the center of curvature substantially in alignment with the central portions of the side walls whereby an independent support is provided for the inner casing which minimizes distortions in use and under variable load to the extent that the capacity of the inner casing remains substantially constant.

3. In a refrigerated storage tank for use with perishable liquids comprising a pair of inner and outer shells having curvilinear bottom and side walls and open at the top and formed of rigid material spaced one from the other all around with heat insulating material in between, evaporator plates having an inlet at one end into which liquid refrigerant is introduced and an outlet in another end from which the evaporated gaseous refrigerant is returned to a liquefaction system, and cover plates shiftable between raised position for access through the open end at the top into the interior of the inner shell and closed position for sealing off the open end of the shell, means for circulating liquid refrigerant to the evaporator plates for purposes of refrigeration, and means for agitation of the liquid material within the inner shell for maintaining uniform temperature distribution, the improvement which comprises means for securely holding the cover plates in open position including in cooperation a pair of hinge blocks fixed to the top of the casings in laterally spaced apart relation corresponding to the width of the cover plate and in which the hinge block is formed with an upwardly extending flange having a groove in the upper edge spaced a short distance from the forward end, an edge portion which is inclined downwardly from the rearward end of the groove and which terminates in an upwardly extending rearward end portion having an arm extending forwardly from the upper end thereof to form a hook, and hinge plates rigid with the cover plates and extending inwardly from the edges thereof in laterally spaced apart relation to lie alongside the hinge blocks in position of use and in which the hinge plate is formed with a bottom edge extending as a continuation in alignment with the bottom edge of the cover plate, and a vertically disposed edge which extends upwardly at an obtuse angle with the bottom edge and a curvilinear corner portion joining the edges, a flange plate extending inwardly perpendicularly at a slope from the hinge plate with the lower end of the flange plate aligned slightly above the groove and dimensioned to have a length less than the distance between the base of the groove and the end of the rearward extending hook on the hinge block when the cover plate is in closed position.

4. In a refrigerated storage tank for use with perishable liquids comprising a pair of inner and outer shells having curvilinear bottom and side walls and open at the top and formed of rigid material spaced one from the other all around with heat insulating material in between, evaporator plates having an inlet at one end into which liquid refrigerant is introduced and an outlet in another end from which the evaporated gaseous refrigerant is returned to a liquefaction system, and cover plates shiftable between raised position for access through the open end at the top into the interior of the inner shell and closed position for sealing off the open end of the shell, means for circulating liquid refrigerant to the evaporator plates for purposes of refrigeration and means for agitation of the liquid material within the inner shell for maintaining uniform temperature distribution, a top wall covering a part of the open end of the inner casing, a driving motor mounted outside the casing over the top wall portion thereof, an agitator located within the casing, an agitator shaft extending downwardly through an opening in the top wall into communication with the agitator for operation thereof, means interconnecting the driving motor with the shaft for transmitting rotational movement from one to the other, the improvement which comprises a shaft joined with the agitator for operation thereof and which is separate and apart from the agitator shaft operatively connected to the driving motor, an adapter means for interconnecting the one shaft with the other for enabling an operative connection between the shafts to be made and broken in a simple and efficient manner comprising an upper adapter member in the form of a cylindrical rod having a bore in one end portion dimensioned to receive the end of the propeller shaft in communication with the driving motor for establishing a driving relation therebetween, a rod of smaller dimension extending axially from the opposite end of the cylindrical member and flanges extending outwardly from the end portion thereof for a distance corresponding to the difference between the radius of the end of smaller dimension and the remainder and a lower adapter member in the form of a cylindrical section having a diameter corresponding to that of the upper adapter member with a bore in the lower end portion dimensioned to receive the end of the agitator shaft in driving relation, the upper end portion of the lower adapter member having a bore dimensioned to receive the lower end portion of smaller dimension of the upper adapter member, vertically disposed slots through the walls of the lower adapter member in communication with the bore in the upper end and dimensioned to receive the flanges extending outwardly from the lower end portion of the upper adapter member in sliding relation and circumferential slots extending as a continuation of the vertical slots at the lower end and dimensioned to receive the flanges on the lower end of the upper adapter member.

5. In a refrigerated storage tank for use with perishable liquids comprising a pair of inner and outer shells having curvilinear bottom and side walls and open at the top and formed of rigid material spaced one from the other all around with heat insulating material in between, evaporator plates having an inlet at one end into which liquid refrigerant is introduced and an outlet in another end from which the evaporated gaseous refrigerant is returned to a liquefaction system, and cover plates shiftable between raised position for access through the open end at the top into the interior of the inner shell and closed position for sealing off the open end of the shell, means for circulating liquid refrigerant to the evaporator plates for purposes of refrigeration, and means for agitation of the liquid material within the inner shell for maintaining uniform temperature distribution, the improvement which comprises mounting the liquefaction system on one end of the outer shell to provide a self-contained unit, the liquefaction means comprises a heat exchanger through which the cold gas from the evaporator plates is positioned in heat exchange relation with compressed liquid refrigerant for reducing the temperature of the latter, a compressor in communication with the heat exchanger for raising the pressure of the evaporated gas received from the heat exchanger, a cooling member in communication with the compressor for extracting heat of compression out of the compressed gas, a condenser in communication with the cooling member for receiving and storing the liquid refrigerant which has condensed, the improvement which comprises a valve responsive to the temperature of the liquid content material within the inner casing for controlling the flow of liquid refrigerant to the evaporator, and a second valve responsive to the temperature of the gas from the evaporator for controlling the amount of liquid refrigerant introduced into the evaporator.

References Cited in the file of this patent
UNITED STATES PATENTS

| | | |
|---|---|---|
| 2,277,526 | Mojonnier | Mar. 24, 1942 |
| 2,300,058 | Osborn et al. | Oct. 27, 1942 |
| 2,370,888 | Sticelber | Mar. 6, 1945 |
| 2,470,979 | Duncan | May 24, 1949 |
| 2,545,371 | Mojonnier | Mar. 13, 1951 |
| 2,557,252 | Bannister et al. | June 19, 1951 |
| 2,594,603 | Zamboni | Apr. 29, 1952 |
| 2,617,264 | McGovern | Nov. 11, 1952 |
| 2,691,873 | Skoli | Oct. 19, 1954 |